United States Patent [19]

Rörig et al.

[11] Patent Number: 5,041,239

[45] Date of Patent: * Aug. 20, 1991

[54] PREMIX COMPOSITIONS FOR THE PREPARATION OF THICKENED AQUEOUS ACID SOLUTIONS

[75] Inventors: Hans Rörig, Merzenich; Norbert Porta, Nörvenich, both of Fed. Rep. of Germany

[73] Assignee: Akzo N. V., Netherlands

[ * ] Notice: The portion of the term of this patent subsequent to Aug. 1, 2006 has been disclaimed.

[21] Appl. No.: 338,105

[22] Filed: Apr. 14, 1989

Related U.S. Application Data

[63] Continuation of Ser. No. 102,332, Sep. 29, 1987, Pat. No. 4,853,146.

[30] Foreign Application Priority Data

Jan. 24, 1987 [EP] European Pat. Off. ........ 87200096.3

[51] Int. Cl.[5] ........................ B01J 13/00; C11D 1/12; C11D 3/26; C11D 7/32

[52] U.S. Cl. ................................ 252/315.1; 252/544; 252/548; 252/142; 252/542; 252/DIG. 14

[58] Field of Search ............... 252/544, 548, 142, 542, 252/DIG. 14, 315.1

[56] References Cited

U.S. PATENT DOCUMENTS

| | | | |
|---|---|---|---|
| 4,061,580 | 12/1977 | Jahnke | 252/8.55 R |
| 4,142,999 | 3/1979 | Bloching et al. | 252/544 |
| 4,666,615 | 5/1987 | Disch et al. | 252/110 |
| 4,666,622 | 9/1987 | Martin et al. | 252/99 |
| 4,743,395 | 5/1988 | Leifheit | 252/106 |
| 4,783,283 | 11/1988 | Stoddart | 252/547 |
| 4,800,036 | 1/1989 | Rose et al. | 252/102 |
| 4,853,146 | 8/1989 | Rörig et al. | 252/142 |

FOREIGN PATENT DOCUMENTS

| | | |
|---|---|---|
| 0199383 | 9/1986 | European Pat. Off. . |
| 2459830 | 6/1979 | France . |
| 489976 | 3/1980 | Spain . |
| 1443244 | 7/1976 | United Kingdom . |

*Primary Examiner*—Paul Lieberman

*Assistant Examiner*—Kevin D. McCarthy

*Attorney, Agent, or Firm*—Oliff & Berridge

[57] ABSTRACT

A premix composition suitable for the preparation of thicknened aqueous compositions by dilution with water, containing (i) an amine, selected from the group consisting of primary amines, secondary amines, tertiary amines, diamines, and amines in the form of a heterocyclic ring, wherein the primary, secondary, tertiary amines, and diamines carry at least one nitrogen linked hydrocarbon group which represents a saturated or unsaturated linear or branched alkyl group having at least 10 carbon atoms or an aryl, aralkyl or alkaryl containing up to 24 carbon atoms, and wherein the other nitrogen linked groups may be different or the same and represents hydrogen, substituted or unsubstituted alkyl groups, aryl groups, aralkyl groups or polyalkoxy groups containing 1–3 alkoxy groups, or wherein when the amine selected is in the form of a heterocyclic ring, it contains at least two nitrogen atoms, one of which being substituted by amino (lower) alkyl or hydroxy (lower) alkyl, which optionally is reacted with fatty acids, and the heterocyclic ring is further substituted with a linear or branched alkyl or alkenyl group having at least 10 carbon atoms; (ii) an organic anionic sulphonate selected from the group consisting of cumene sulphonate, xylene sulphonate, and toluene sulphonate, in their acid or salt form, and mixtures thereof.

16 Claims, No Drawings

PREMIX COMPOSITIONS FOR THE PREPARATION OF THICKENED AQUEOUS ACID SOLUTIONS

This is a continuation of application Ser. No. 07/102,332 filed Sept. 29, 1987 now U.S. Pat. 4,853,146.

FIELD OF THE INVENTION

The invention relates to thickened aqueous compositions incorporating low levels of amines or amine derivatives and low molecular weight aromatic sulphonates and displaying pronounced shear thinning behaviour, i.e., exhibiting high viscosities at low rates of shear.

This type of behavior is of particular advantage to cleaning compositions intended to be applied to non-horizontal structural surfaces such as walls and windows and sanitary fittings such as sinks, baths, showers, wash basins and lavatories. The invention is especially concerned with aqueous acid-containing cleaning compositions which are commonly applied to the surfaces of sanitary fittings.

BACKGROUND OF THE INVENTION

It is well known that the higher the viscosity of a liquid composition, the greater will be its residence time when applied to a non-horizontal surface such as a wall. This viscosity can be increased in many ways. Especially for compositions containing a hypochlorite bleach, a variety of formulations have been proposed, but thickening systems have also been proposed for aqueous cleaning compositions of a pH not higher than 7.0. GB 1,240,469, for instance, discloses compositions, suitable for cleaning metal, glass and painted surfaces, which compositions have a pH not higher than 7.0 and comprise (a) an inorganic acid, an organic acid or an acidic salt (b) a cationic detergent and (c) a water insoluble or partially water soluble covalent compound other than the compounds under (b) and which contains oxygen or halogen and at least one hydrocarbon chain of at least four carbon atoms.

As component (c) can more particularly be used an ester of an inorganic acid, a fatty acid or an ester of a fatty acid, a carboxylic acid ester in which the hydrocarbon chain derived from the alcohol has at least four carbon atoms, an alkyl chloride, a hydroxyl compound or substituted hydroxy compound, and the hydroxy compound is preferably water insoluble, such as a fatty alcohol, containing from 4–30 carbon atoms in at least one alkyl chain.

As cationic detergent only an amine oxide of a special structure is mentioned, which is exemplified by a large number of representatives, the actual application of quaternary ammonium salts being neither disclosed in general terms, nor in specifically exemplified representatives.

U.S. Pat. No. 3,997,453 discloses a stable, cold water dispersible fabric softening composition comprising from about 60 to 20% by weight of a cationic quaternary ammonium softener, an organic anionic sulphonate, the weight ratio of the cationic softener to the anionic detergent being from about 40:1 to 5:1, and wherein the anionic sulphonate is selected from benzene or naphthalene sulphonate or a polyalkyl substituted aromatic sulphonate with one of the alkyl groups having not more than 18 C-atoms and each of the remaining alkyl groups has not more than 2 carbon atoms.

Considering the statements in U.S. Pat. No. 3,997,453, lines 42–45 and lines 57–64 of column, it is clear that a person skilled in the art would only be led away from trying to use combinations of cationic quarternary compounds and an anionic sulphonate as thickening composition. A person skilled in the art was even fortified in that prejudice on account of Kunishov et al, Tr. Mezhdunar. Kong. Paverkhn.—Akt. Veschestvam, 7 th 1976 (publ. 1978), 3, 150–8, Nats. Komm. SSSR Poverchn.—Akt. Veschchestvam Moscow, USSR.

British Patent Application No. 2,010,892 discloses an aqueous liquid detergent composition especially adapted for dishwashing, comprising 5–60% by weight of an organic synthetic surfactant system of at least two surfactants and 5–50% by weight of citrus juice, said organic synthetic surfactant system consisting of 1) from 30–90 parts by weight of the surfactant system of a calcium sensitive anionic surfactant selected from the group consisting of water-soluble $C_8$–$C_{16}$ alkyl benzene sulphonates, alkane sulphonates having 8–20 carbon atoms, olefin sulphonates having 8–20 carbon atoms, di-$C_{8-20}$ alkyl sulphosuccinates, di-$C_{8-12}$ alkylphenol sulphosuccinates, primary and secondary alkyl sulphates having 8–20 carbon atoms, $C_{8-20}$ alkyl polyethoxy sulphates having 1–25 ethoxygroups and mixtures thereof;
2) from about 70–10 parts by weight of a less calcium sensitive second surfactant selected from the group consisting of water-soluble nonionic condensation products obtained by condensing from 5–30 moles of an alkylene oxide, preferably ethylene or propylene oxide, with one mole of a hydrophobic compound having 8–24 carbon atoms and at least one reactive hydrogen atom, e.g., an amino group. According to page 3, lines 2–4, as additional optional ingredients can be added: hydrotropes and solubilizing agents such as sodium or potassium toluene sulphonate and sodium or potassium xylene sulphonate, which are generally added to promote phase stability, especially of compositions with high concentrations of surfactants.

However, considering these afore-mentioned statements in GB-A-2,010,892, it is clear that a person skilled in the art when looking for thickening compositions, would only be led away from trying to prepare thickening compositions based on the use of solubilizing viscosity decreasing cumene, toluene or xylene sulphonates, having moreover in mind the prejudice as mentioned hereinbefore on page 2.

A similar picture may be derived by a person skilled in the art from European Patent Application No. 0,172,534, disclosing compositions for cleaning hard surfaces, having a content of (a) non-ionic adducts of ethylene oxide to aliphatic vicinal hydroxyamine with a linear alkyl chain of 10 to 20 carbon atoms (b) anionic surfactants (consisting of linear alkylbenzene sulphonate or linear alkane sulphonate with 8–20 carbon atoms in the alkyl residue) and optionally other usual components of such compositions, wherein the amount of adduct of 3–20 moles of ethylene oxide and the sulphonate is 2 to 30% by weight and wherein the ratio of a:b is from 1:1 to 1:15.

According to page 5, citric acid, tartaric acid, benzene hexacarboxylic acid, phosphoric acid, lactic acid, and the like, may be added to these compositions.

Moreover, European Patent Application No. 0,172,534 on page 5 states that known hydrotrophe compounds, e.g., lower alkyl arylsulphonate such as toluene, xylene or cumene sulphonate, may be added as such or in the salt form.

As a result of extensive research and experimentation it has surprisingly been found now that improved thickened aqueous phase cleaning compositions could be obtained, which comprise a) 0.1-50% by weight of a weak acid, having a pK value >2.0;
b) from 0.1 to 20% by weight of an amine, more particularly selected from primary, secondary or tertiary amines and diamines carrying at least one nitrogen linked hydrocarbon group, which represents a saturated or unsaturated linear or branched alkyl group having at least 10 carbon atoms and preferably 16–24 carbon atoms, or an aryl, aralkyl or alkarygroup containing up to 24carbon atoms, and wherein the optional other nitrogen linked groups are formed by optionally substituted alkylgroups, arylgroup or aralkylgroups or polyalkoxy groups and preferably polyethoxy or polypropoxy groups, containing at most 5 alkoxygroups and more preferably 1-3, or wherein the amine is in the form of a heterocyclic ring, containing at least two nitrogen atoms, one of which being substituted by amino (lower) alkyl or hydroxy (lower) alkyl, preferably reacted with fatty acids, with the ring further carrying a linear or branched alkyl or alkenyl group having at least 10 carbon atoms;
c) from 0.01% to 5% by weight of an organic, anionic sulphonate selected from the group consisting of cumene sulphonate, xylene sulphonate, and toluene sulphonate, in their acid or salt form, and mixtures thereof; and
d) water at 100% by weight, wherein optionally one or more additional cleaning, disinfecting and/or odorizing agents may be dissolved in minor amounts, the percentages by weight being calculated on the weight of the total aqueous composition.

A preferred embodiment of the afore-defined compositions is formed by thickened aqueous cleaning compositions having a pH from 0.5–4, containing 1–10% by weight of the amine and containing 1–10% by weight of an acid having a pK value of 2.8–5.5, and preferably 3.0–5.0. More specifically an acid selected from the group consisting of formic acid, citric acid, tartaric acid, succinic acid, adipic acid, acetic acid, phosphoric acid, sulphamic acid, glutaric acid, and lactic acid used. Most preferred are the compositions containing formic acid or citric acid.

Examples of additional cleaning, disinfecting and/or odorizing agents are detergent builder salts, perfumes, antibiotics or auxiliary detergents, which may normally be used in an amount of up to 5% by weight.

Specific classes of the amines as specified under (b) can be represented by the following formulae:

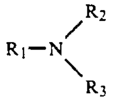

I wherein $R_1$ represents a saturated or unsaturated linear or branched alkyl group having at least 10 carbon atoms and preferably 16–24 carbon atoms, or an aryl, aralkyl or alkaryl group containing up to 24 carbon atoms, wherein $R_2$ and $R_3$ may be the same or different and represent hydrogen, an alkyl group, and preferably a lower alkyl group containing 1–4 carbon atoms and more preferably a methyl group, or poly(alkoxy) group, preferably a poly(ethoxy) or poly(propoxy) group, wherein more preferably the number of ethoxy or propoxy radicals is at most 5, or

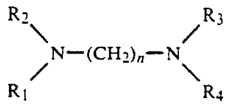

II wherein $R_1$ is defined before and $R_2$, $R_3$ and $R_4$ may be the same or different and represent hydrogen, alkyl, poly(ethoxy) or poly(propoxy) groups, and n is a number from 1 to 6 and more preferably 2-4 , or

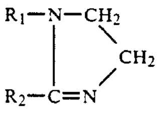

III wherein $R_1$ is a hydroxyalkyl or amino alkyl group containing 1–4 carbon atoms, preferably reacted with a saturated or unsaturated fatty acid with 8–20 carbon atoms and $R_2$ is an alkyl or alkenyl group, linear or branched, with 8–20 carbon atoms.

A class of more specific examples of the amines as defined hereinbefore comprises:

oleyl amine,
stearyl amine,
tallow amine,
hydrogenated tallow amine,
lauryl amine,
myristyl amine,
cetyl amine, and
soja alkyl amine or mixtures thereof.

A preferred group of these compounds comprises oleyl amine and tallow amine.

According to another embodiment of the present compositions, a typical class of amines as defined hereinbefore, comprises:

bis(2-hydroxyethyl)oleyl amine,
bis(2-hydroxyethyl ethoxy)oleyl amine,
bis[2-hydroxyethyl tetra(ethoxy)]oleyl amine,
bis(2-hydroxyethyl)stearyl amine,
bis(2-hydroxyethyl ethoxy)stearyl amine,
bis[2-hydroxyethyl tetra(ethoxy)]stearyl amine,
bis(2-hydroxyethyl)tallow amine,
bis(2-hydroxyethyl)hydrogenated tallow amine,
bis[2-hydroxyethyl tetra(ethoxy)]tallow amine,
bis(2-hydroxyethyl)lauryl amine,
bis(2-hydroxyethyl)myristyl amine,
bis(2-hydroxyethyl)soja alkyl amine,
bis(2-hydroxyethyl ethoxy)soja alkyl amine,
bis[2-hydroxyethyl tri(ethoxy)]soja alkyl amine,
bis[2-hydroxyethyl tri(ethoxy)]lauryl amine,
bis[2-hydroxyethyl di(ethoxy)]lauryl amine,
bis(2-hydroxyethyl ethoxy)lauryl amine,
bis(2-hydroxyethyl ethoxy)myristyl amine,
bis(2-hydroxyethyl)cetyl amine,
bis(2-hydroxyethyl ethoxy)cetyl amine,
bis[2-hydroxyethyl tri(ethoxy)]cetyl amine,
bis[2-hydroxyethyl tri(ethoxy)]lauryl amine,
bis[2-hydroxyethyl tri(ethoxy)]myristyl amine,
bis[2-hydroxyethyl di(ethoxy)]tallow maine,
bis[2-hydroxyethyl tri(ethoxy)]tallow amine,
bis[2-hydroxyethyl tri(ethoxy)]oleyl amine, bis[2-hydroxyethyl tri(ethoxy)]stearyl amine,
bis(2-hydroxypropyl)oleyl amine,
bis(2-hydroxypropyl)stearyl amine,
bis(2-hydroxypropyl)tallow amine,
bis(2-hydroxypropyl)hydrogenated tallow amine,
bis(2-hydroxypropyl)lauryl amine,
bis(2-hydroxypropyl)myristyl amine,
bis(2-hydroxypropyl)cetyl amine,
bis(2-hydroxypropyl)soja alkyl amine,
bis(2-hydroxypropyl propoxyl)oleyl amine,
bis(2-hydroxypropyl propoxy)soja alkyl amine,
bis(2-hydroxypropyl propoxy)stearyl amine,
bis(2-hydroxypropyl propoxy)tallow amine,
bis(2-hydroxypropyl propoxy)hydrogenated tallow amine,
bis(2-hydroxypropyl propoxy)lauryl amine,
bis(2-hydroxypropyl propoxy)myristyl amine,
bis(2-hydroxypropyl propoxy)cetyl amine,
bis[2-hydroxypropyl di(propoxy)]oleyl amine,
bis[2-hydroxypropyl di(propoxy)]stearyl amine,
bis[2-hydroxypropyl di(propoxy)]tallow amine,
bis[2-hydroxypropyl di(propoxy)]hydrogenated tallow amine,
bis[2-hydroxypropyl di(propoxy)]lauryl amine,
bis[2-hydroxypropyl di(propoxy)]myristyl amine,
bis[2-hydroxypropyl di(propoxy)]soja alkyl amine,
bis[2-hydroxypropyl di(propoxy)]cetyl amine,
bis[2-hydroxypropyl tri(propoxy)]oleyl amine,
bis[2-hydroxypropyl tri(propoxy)]soja alkyl amine,
bis[2-hydroxypropyl tri(propoxy)]stearyl amine,
bis[2-hydroxypropyl tri(propoxy)]tallow amine,
bis[2-hydroxypropyl tri(propoxy)]hydrogenated tallow amine,
bis[2-hydroxypropyl tri(propoxy)]lauryl amine,
bis[2-hydroxypropyl tri(propoxy)]myristyl amine,
bis[2-hydroxypropyl tri(propoxy)]cetyl amine,
bis[2-hydroxypropyl tetra(propoxy)]oleyl amine,
bis[2-hydroxypropyl tetra(propoxy)]soja alkyl amine,
bis[2-hydroxypropyl tetra(propoxy)]stearyl amine,
bis[2-hydroxypropyl tetra(propoxy)]tallow amine,
bis[2-hydroxypropyl tetra(propoxy)]hydrogenated tallow amine,
bis[2-hydroxypropyl tetra(propoxy)]lauryl amine,
bis[2-hydroxypropyl tetra(propoxy)]myristyl amine, and
bis[2-hydroxypropyl tetra(propoxy)]cetyl amine or mixtures thereof.

A preferred group of these compounds is comprising:
bis(2-hydroxyethyl)tallow amine,
bis(2-hydroxyethyl)hydrogenated tallow amine,
bis(2-hydroxyethyl)soja alkyl amine,
bis(2-hydroxyethyl)cetyl amine,
bis(2-hydroxyethyl)oleyl amine,
bis(2-hydroxypropyl)tallow amine,
bis(2-hydroxypropyl)hydrogenated tallow amine,
bis(2-hydroxypropyl)soja alkyl amine,
bis(2-hydroxypropyl)cetyl amine,
bis(2-hydroxypropyl)oleyl amine,
bis(2-hydroxyethyl ethoxy)tallow amine,
bis(2-hydroxyethyl ethoxy)hydrogenated tallow amine,
bis(2-hydroxyethyl ethoxy)soja alkyl amine,
bis(2-hydroxyethyl ethoxy)cetyl amine,
bis(2-hydroxyethyl ethoxy)oleyl amine,
bis(2-hydroxypropyl propoxy)tallow amine,
bis(2-hydroxypropyl propoxy)hydrogenated tallow amine,
bis(2-hydroxypropyl propoxy)soja alkyl amine,
bis(2-hydroxypropyl propoxy)cetyl amine, and
bis(2-hydroxypropyl propoxy)oleyl amine or mixtures thereof.

Most preferably
bis(2-hydroxyethyl)oleyl amine,
bis(2-hydroxypropyl)oleyl amine,
bis(2-hydroxypropyl)tallow amine, and
bis(2-hydroxyethyl)tallow amine are used.

According to another embodiment of the present compositions, a typical specific class of amines as defined hereinbefore, comprises:
N,N-dimethyl oleyl amine,
N,N-diethyl oleyl amine,
N,N-dibenzyl oleyl amine,
N,N-difenyl oleyl amine,
N,N-dipropyl oleyl amine,
N,N-dimethyl stearyl amine,
N,N-diethyl stearyl amine,
N,N-dipropyl stearyl amine,
N,N-dibenzyl stearyl amine,
N,N-difenyl stearyl amine,
N,N-dimethyl (hydrogenated) tallow amine,
N,N-diethyl (hydrogenated) tallow amine,
N,N-dipropyl (hydrogenated) tallow amine,
N,N-dibenzyl (hydrogenated) tallow amine,
N,N-difenyl (hydrogenated) tallow amine,
N,N-dimethyl soja alkyl amine,
N,N-diethyl soja alkyl amine,
N,N-dipropyl soja alkyl amine,
N,N-dibenzyl soja alkyl amine,
N,N-difenyl soja alkyl amine,
N,N-dimethyl lauryl amine,
N,N-diethyl lauryl amine,
N,N-dipropyl lauryl amine,
N,N-dibenzyl lauryl amine,
N,N-difenyl lauryl amine,
N,N-dimethyl myristyl amine,
N,N-diethyl myristyl amine,
N,N-dipropyl myristyl amine,
N,N-dibenzyl myristyl amine,
N,N-difenyl myristyl amine,
N,N-dimethyl cetyl amine,
N,N-diethyl cetyl amine,
N,N-dipropyl cetyl amine,
N,N-dibenzyl cetyl amine, and
N,N-difenyl cetyl amine or mixtures thereof.

A preferred group of the latter class comprises:
N,N-dimethyl oleyl amine,
N,N-dimethyl lauryl amine,
N,N-dimethyl cetyl amine,
N,N-dimethyl myristyl amine,
N,N-dimethyl soja alkyl amine,
N,N-dimethyl tallow amine, and
N,N-dimethyl stearyl amine or mixture thereof.

Most preferably
N,N-dimethyl oleyl amine,
N,N-dimethyl tallow amine, and
N,N-dimethyl soja alkyl amine are used.

According to another embodiment of the present compositions, a typical specific class of amines as defined hereinbefore, comprises:
N-oleyl-1,3diaminopropane,
N-stearyl-1,3diaminopropane,
N-(hydrogenated)tallow-1,3diaminopropane,
N-soja alkyl-1,3diaminopropane,
N-lauryl-1,3diaminopropane,
N-myristyl-1,3diaminopropane,
N-cetyl-1,3-diaminopropane,
N-oleyl-1,4-diaminobutane, N-stearyl-1,4-diaminobutane,
N-(hydrogenated)tallow-1,4-diaminobutane,
N-soja alkyl-1,4-diaminobutane,
N-lauryl-1,4-diaminobutane,
N-myristyl-1,4-diaminobutane,
N-cetyl-1,4-diaminobutane,
N-oleyl-1,5-diaminopentane,
N-stearyl-1,5-diaminopentane,
N-(hydrogenated)tallow-1,5-diaminopentane,
N-soja alkyl-1,5-diaminopentane,
N-lauryl-1,5-diaminopentane,
N-myristyl-1,5-diaminopentane,
N-cetyl-1,5-diaminopentane or mixtures thereof.

A preferred group of the latter group comprises:
N-oleyl-1,3-diaminopropane,
N-oleyl-1,4-diaminobutane,
N-tallow-1,3-diaminopropane,
N-tallow-1,4-diaminobutane,
N-stearyl-1,3-diaminopropane,
N-stearyl-1,4-diaminobutane, Most preferably
N-oleyl-1,3-diaminopropane,
N-oleyl-1,4-diaminobutane,
N-tallow-1,3-diaminopropane, and
N-tallow-1,4-diaminobutane are used.

According to another embodiment of the present compositions, a typical specific class of amines as defined hereinbefore, comprises:
2-oleyl-1-aminoethyl-4,5dihydro imidazole,
2-stearyl-1-aminoethyl-4,5dihydro imidazole,
2-(hydrogenated)tallow-1-aminoethyl-4,5dihydro imidazole,
2-soja alkyl-1-aminoethyl-4,5-dihydro imidazole,
2-lauryl-1-aminoethyl-4,5-dihydro imidazole,
2-myristyl-1-aminoethyl-4,5-dihydro imidazole,
2-cetyl-1-aminoethyl-4,5-dihydro imidazole,
2-oleyl-1-amino-n-propyl-4,5-dihydro imidazole,
2-stearyl-1-amino-n-propyl-4,5-dihydro imidazole,
2-(hydrogenated)tallow-1-amino-n-propyl-4,5-dihydro imidazole,
2-soja-alkyl-1-amino-n-propyl-4,5-dihydro imidazole,
2-lauryl-1-amino-n-propyl-4,5-dihydro imidazole,
2-myristyl-1-amino-n-propyl-4,5-dihydro imidazole,
2-cetyl-1-amino-n-propyl-4,5-dihydro imidazole,
2-oleyl-1-amino-n-butyl-4,5-dihydro imidazole,
2-stearyl-1-amino-n-butyl-4,5-dihydro imidazole,
2-(hydrogenated)tallow-1-amino-n-butyl-4,5-dihydro imidazole,
2-soja-alkyl-1-amino-n-butyl-4,5-dihydro imidazole,
2-lauryl-1-amino-n-butyl-4,5-dihydro imidazole,
2-myristyl-1-amino-n-butyl-4,5-dihydro imidazole,
2-cetyl-1-amino-n-butyl-4,5-dihydro imidazole,
2-oleyl-1-hydroxyethyl-4,5-dihydro imidazole,
2-stearyl-1-hydroxyethyl-4,5-dihydro imidazole,
2-(hydrogenated)tallow-1-hydroxyethyl-4,5-dihydro imidazole,
2-soja-alkyl-1-hydroxyethyl-4,5-dihydro imidazole,
2-lauryl-1-hydroxyethyl-4,5-dihydro imidazole,
2-myristyl-1-hydroxyethyl-4,5-dihydro imidazole,
2-cetyl-1-hydroxyethyl-4,5-dihydro imidazole,
2-oleyl-1-hydroxy-n-propyl-4,5-dihydro imidazole,
2-stearyl-1-hydroxy-n-propyl-4,5-dihydro imidazole,
2-(hydrogenated)tallow-1-hydroxy-n-propyl-4,5-dihydro imidazole,
2-soja-alkyl-1-hydroxy-n-propyl-4,5-dihydro imidazole,
2-lauryl-1-hydroxy-n-propyl-4,5-dihydro imidazole,
2-myristyl-1-hydroxy-n-propyl-4,5-dihydro imidazole,
2-cetyl-1-hydroxy-n-propyl-4,5-dihydro imidazole,
2-oleyl-1-hydroxy-n-butyl-4,5-dihydro imidazole,
2-stearyl-1-hydroxy-n-butyl-4,5-dihydro imidazole,
2-(hydrogenated)tallow-1-hydroxy-n-butyl-4,5-dihydro imidazole,
2-soja-alkyl-1-hydroxy-n-butyl-4,5-dihydro imidazole,
2-lauryl-1-hydroxy-n-butyl-4,5-dihydro imidazole,
2-myristyl-1-hydroxy-n-butyl-4,5-dihydro imidazole, and
2-cetyl-1-hydroxy-n-butyl-4,5-dihydro imidazole or mixtures thereof.

A preferred group of the latter class comprises:
2-oleyl-1-aminoethyl-4,5-dihydro imidazole,
2-tallow-1-aminoethyl-4,5-dihydro imidazole,
2-soja alkyl-1-aminoethyl-4,5-dihydro imidazole,
2-oleyl-1-hydroxyethyl-4,5-dihydro imidazole,
2-soja alkyl-1-hydroxyethyl-4,5-dihydro imidazole, and
2-tallow-1-hydroxyethyl-4,5-dihydro imidazole.

Most preferably
2-oleyl-1-aminoethyl-4,5-dihydro imidazole,
2-oleyl-1-hydroxyethyl-4,5-dihydro imidazole,
2-tallow-1-aminoethyl-4,5-dihydro imidazole, and
2-tallow-1-hydroxyethyl-4,5-dihydro imidazole are used.

The amines are more preferably used in amounts from 1 to 5% by weight based on the total weight of the composition, depending on the specific type of the agent and the desired final viscosity.

Preferred embodiments of the present compositions are formed by those containing one or more salts of the sulphonates, specified under (c). Typical salts of the sulphonates, specified under (c) are the sodium, potassium, ammonium, and lower amine salts, of which the sodium salts are preferred. The sodium salt of xylene sulphonate is more preferred. The sulphonates are preferably used in amounts from 1 to 5% by weight, based on the total weight of the composition.

The compositions according to the present invention exhibit a viscosity of at least 200 mPa.s at 20° C.

For compositions exhibiting optimum thickening effects, the ratio of the weights of, e.g., the amine and the sulphonate is in the range from 0.1–6 and preferably from 1.5–3 and more preferably around about 2.5.

A more preferred embodiment of the thickened cleaning compositions of the present invention is formed by a thickened cleaning composition which comprises:

a) 10% by weight of formic acid or citric acid,
b) 2% by weight of N,N-dimethyl oleyl amine or bis(2-hydroxyethyl)oleyl amine or N-oleyl-1,3-diaminopropane,
c) 2% by weight of sodium xylene sulphonate (40%),
d) 0.2% by weight of methylsalicylate as perfume, and
e) water to 100% showing a viscosity, measured by means of a Brookfield LVT, 60 rpm at 20° C., of 550–1000 mPa.s.

It will be appreciated that another aspect of the invention is formed by a premix compositions for the preparation of the afore-described thickened aqueous compositions by dilution with water, optionally, containing other desired ingredients, which comprise at least:

i) an amine as specified hereinbefore under (b);
ii) an organic anionic sulphonate as specified hereinbefore under (c).

It will be appreciated that the thickened aqueous compositions according to the present invention may be prepared by dilution of such a premix composition with water, containing the desired amount of weak acid and of other desired minor ingredients. According to an alternative embodiment of the preparation of the finally used thickened aqueous compositions, the weak acid independently may be added to the premix before or after the addition of water.

The thickening systems described above display a viscosity temperature relationship that has a parabolic profile with the maximum viscosity being obtained at a temperature in the range from 0° C. to 30° C. An increase in chain length of the higher alkyl chain in the amine will in general cause the temperature at which this peak occurs to be higher, whereas a reduction of this higher alkyl chain length and/or branching of this alkyl chain, causes the temperature at which the maximum viscosity is produced by the system to be lower.

It will be appreciated by persons skilled in the art that an ideal situation, wherein the viscosity of the composition should be independent of the temperature over a temperature range which encompasses the practical domestic use conditions, i.e., from 5°-25° C., is approached most closely by the compositions of the present invention, employing a blend of specific amines and specific sulphonates, the application of which would certainly be rejected by persons skilled in the art.

It will be appreciated by persons skilled in the art that the optimum characteristics of the compositions of the present invention will be governed by the specific kind of amine, kind of sulphonate, kind of acid in the composition, amount of acid electrolyte concentration in total composition, ratio of weights of the amine-sulphonate combination and counter ion of the sulphonates.

Another feature of the present invention is formed by the application of the thickened aqueous single phase compositions according to the usual methods of this specific art of cleaning non-horizontal surfaces such as walls, windows and sanitary fittings.

The invention is illustrated by the following examples without restricting the scope of these embodiments.

Example 1

Preparation of thickened cleaning composition comprising formic acid, sodium xylene sulphonate, and N,N-dimethyl oleyl amine.

Formic acid (10 g) was dissolved in about 86 ml of demineralized water with stirring at 20° C., after 2 g of N,N-dimethyloleyl amine (Armeen DMOD®) were added, followed by the addition, with continued stirring, of 2 g of sodium xylene sulphonate (40%, i.e. added in the form of a 40% by weight solution).

During the addition of the sulphonate the viscosity immediately increased and was finally 990 mPa.s, measured by means of a Brookfield LVT, 60 rpm, viscosimeter. The solution obtained was perfectly clear and stable at elevated temperature (40° C.).

Example 2

By a method similar to Example 1, an aqueous composition was prepared from 10 g of formic acid in 86 ml of demineralized water, 2 g of N,N-dimethyl oleyl amine, 1.75 g of sodium xylene sulphonate (40%) and 0.25 g of methyl salicylate as perfume. During the addition of the sulphonate the viscosity immediately increased and was finally 550 mPa.s, measured by means of a Brookfield LVT, 60 rpm, viscosimeter. The solution obtained was perfectly clear and stable at elevated temperature (40° C.).

Example 3

By a method similar to Example 1, an aqueous composition was prepared from 10 g of formic acid in 86 ml of demineralized water, 2 g of bis(2-hydroxyethyl)oleyl amine and 2 g of sodium xylene sulphonate (40%). The solution had a viscosity of 660 mPa.s, measured by means of Brookfield LVT 60 rpm, viscosimeter at 20° C. The solution obtained was perfectly clear and stable at elevated temperature (40° C.).

Example 4

By a method similar to Example 1, an aqueous composition was prepared from 5 g of hydrated citric acid in 92 ml of demineralized water, 1.5 g of bis(hydroxyethyl-)oleyl amine and 1.5 g of sodium xylene sulphonate (40%). The solution had a viscosity of 570 mPa.s measured by means of a Brookfield LVT, 60 rpm, viscosimeter at 20° C. The solution obtained was perfectly clear and stable at elevated temperature (40° C.).

Example 5

By a method similar to Example 1, an aqueous composition was prepared from 5 g of hydrated citric acid in 92 ml of demineralized water, 1 g of N-oleyl-1,3-diaminopropane and 2 g of sodium xylene sulphonate (40%). The solution had a viscosity of 200 mPa.s, measured by means of a Brookfield LVT, 60 rpm, viscosimeter at 20° C. The solution obtained was perfectly clear and stable at elevated temperature (40° C.).

Example 6

By a method similar to Example 1, an aqueous composition was prepared from 5 g of hydrated citric acid in 91.5 ml of demineralized water, 2.0 g of N,N-dimethyl oleyl amine, 1.5 g of sodium xylene sulphonate (40%). The solution had a viscosity of 660 mPa.s at 20° C., measured by means of a Brookfield LVT, 60 rpm viscosimeter. The solution obtained was perfectly clear and stable at elevated temperature (40° C.).

Example 7

By a method similar to Example 1, an aqueous composition was prepared from 10 g of formic acid in 86 ml of demineralized water, 1.5 g of soja alkyl amine (Armeen® OD) and 2.5 g of sodium cumenesulphonate (40%). The solution had a viscosity of 210 mPa.s at 20° C., measured by means of a Brookfield LVT, 60 rpm viscosimeter. The solution obtained was perfectly clear and stable at elevated temperature (40° C.).

Example 8

By a method similar to in Example 1, an aqueous composition was prepared from 5 g f lactic acid in 92.7 ml of demineralized water, 1 g of bis(2-hydroxyethyl)oleyl amine, 1.3 g of sodium xylenesulphonate (40%). The solution had a viscosity of 310 mPa.s at 20° C., measured by means of a Brookfield LVT, 60 rpm viscosimeter. The solution obtained was perfectly clear and stable at elevated temperature (40° C.).

Example 9

By a method similar to Example 1, an aqueous composition was prepared from 5 g of tartaric acid in 92.8 ml of demineralized water, 1 g of bis(2-hydroxyethyl)oleyl amine and 1.2 g of sodium xylene sulphonate (40%). The solution had a viscosity of 250 mPa.s at 20° C., measured by means of a Brookfield LVT, 60 rpm viscosimeter. The solution obtained was perfectly clear and stable at elevated temperature (40° C.).

Example 10

By a method similar to Example 1, an aqueous composition was prepared from 10 g of acetic acid in 86.8 ml of demineralized water, 1.5 g of bis(2-hydroxyethyl)oleyl amine and 1.7 g of sodium xylene sulphonate (40%). The solution had a viscosity of 200 mPa.s at 20° C. measured by means of a Brookfield LVT, 60 rpm viscosimeter. The solution obtained was perfectly clear and stable at elevated temperature (40° C.).

Example 11

By a method similar to Example 1, an aqueous composition was prepared from 10 g formic acid in 83 ml of demineralized water, 2 g of bis(2-hdyroxyethyl)oleyl amine, 0.1 g methyl salicylate and 2.6 g potassium-paratoluene sulphonate (40%). The solution had a viscosity of 205 m Pa.s at 20° C. measured by mean of a Brookfield LVT, 60 rpm viscosimeter. The solution obtained was perfectly clear and stable at elevated temperature (40° C.).

I claim:

1. A premix composition suitable for the preparation of thickened aqueous compositions having a pH of 0.5–4.0 by dilution with water, said premix composition comprising:

(i) an amine, selected from the group consist of primary amines, secondary amines, tertiary amines, diamines, and amines in the form of a heterocyclic ring, wherein said primary, secondary, tertiary amines, and diamines carry at least one nitrogen linked hydrocarbon group which represents a saturated or unsaturated linear or branched alkyl group having at least 10 carbon atoms or an aryl, aralkyl or alkaryl containing up to 24 carbon atoms, and wherein the other nitrogen linked groups may be different or the same and represent hydrogen, substituted or unsubstituted alkyl groups, aryl groups, aralkyl groups or polyalkoxy groups containing 1–3 alkoxy groups, or wherein when the amine selected is in the form of a heterocyclic ring, it contains at least two nitrogen atoms, one of which being substituted by amino (lower) alkyl or hydroxy (lower) alkyl, which optionally is reacted with fatty acids, and said heterocyclic ring is further substituted with a linear or branched alkyl or alkenyl group having at least 10 carbon atoms;

(ii) an organic, anionic sulphonate selected from the group consisting of cumene sulphonate, xylene sulphonate, and toluene sulphonate, in their acid or salt form, and mixtures thereof, wherein the ratio of the weight of the amine to the sulphonate is in the range of from 1.5 to 3.

2. The premix composition of claim 1, wherein said primary, secondary, tertiary amines, and diamines carry at least one nitrogen linked hydrocarbon group which represents a saturated or unsaturated linear or branched alkyl group having 16–24 carbon atoms.

3. The premix composition of claim 1, wherein said tertiary amine is selected from the group consisting of:

bis(2-hydroxyethyl)tallow amine,
bis(2-hydroxyethyl)hydrogenated tallow amine,
bis(2-hydroxyethyl)soja alkyl amine,
bis(2-hydroxyethyl)cetyl amine,
bis(2-hydroxyethyl)oleyl amine,
bis(2-hydroxypropyl)tallow amine,
bis(2-hydroxypropyl)hydrogenated tallow amine,
bis(2-hydroxypropyl)soja alkyl amine,
bis(2-hydroxypropyl)cetyl amine,
bis(2-hydroxypropyl)oleyl amine,
bis(2-hydroxyethyl ethoxy)tallow amine,
bis(2-hydroxyethyl ethoxy)hydrogenated tallow amine,
bis(2-hydroxyethyl ethoxy)soja alkyl amine,
bis(2-hydroxyethyl ethoxy)cetyl amine,
bis(2-hydroxyethyl ethoxy)oleyl amine,
bis(2-hydroxypropyl propoxy)tallow amine,
bis(2-hydroxypropyl propoxy)hydrogenated tallow amine,
bis(2-hydroxypropyl propoxy)soja alkyl amine,
bis(2-hydroxypropyl propoxy)cetyl amine, and
bis(2-hydroxypropyl propoxy)oleyl amine and mixtures thereof.

4. The premix composition of claim 3, wherein said tertiary amine is selected from the group consisting of:

bis(2-hydroxyethyl)oleyl amine,
bis(2-hydroxypropyl)oleyl amine,
bis(2-hydroxypropyl)tallow amine, and
bis(2-hydroxyethyl)tallow amine.

5. The premix composition of claim 1, wherein said tertiary amine is selected from the group consisting of:

N,N-dimethyl oleyl amine,
N,N-dimethyl lauryl amine,
N,N-dimethyl cetyl amine,
N,N-dimethyl myristyl amine,
N,N-dimethyl soja alkyl amine,
N,N-dimethyl tallow amine, and
N,N-dimethyl stearyl amine and mixtures thereof.

6. The premix composition of claim 5, wherein said tertiary amine is selected from the group consisting of:

N,N-dimethyl oleyl amine,
N,N-dimethyl tallow amine, and
N,N-dimethyl soja alkyl amine.

7. The premix composition of claim 1, wherein said diamine is selected from the group consisting of:

N-oleyl-1,3-diaminopropane,
N-oleyl-1,4-diaminobutane,
N-tallow-1,3-diaminopropane,
N-tallow-1,4-diaminobutane,
N-stearyl-1,3-diaminopropane, and
N-stearyl-1,4-diaminobutane and mixtures thereof.

8. The premix composition of claim 7, wherein said diamine is selected from the group consisting of:

N-oleyl-1,3-diaminopropane,
N-oleyl-1,4-diaminobutane,
N-tallow-1,3-diaminopropane, and
N-tallow-1,4-diaminobutane.

9. The premix composition of claim 1, wherein said amine in the form of a heterocyclic ring is selected from the group consisting of:

2-oleyl-1-aminoethyl-4,5-dihydroimidazole,
2-tallow-1-aminoethyl-4,5-dihydroimidazole,
2-soja alkyl-1-aminoethyl-4,5-dihydroimidazole,
2-oleyl-1-hydroxyethyl-4,5-dihydroimidazole,
2-soja alkyl-1-hydroxyethyl-4,5-dihydroimidazole, and
2-tallow-1-hydroxyethyl-4,5-dihydroimidazole and mixtures thereof.

10. The premix composition of claim 9, wherein said amine in the form of a heterocyclic ring is selected from the group consisting of:

2-oleyl-1-aminoethyl-4,5-dihydroimidazole,
2-oleyl-1-hydroxyethyl-4,5-dihydroimidazole,
2-tallow-1-aminoethyl-4,5-dihydroimidazole, and 2-tallow-1-hydroxyethyl-4,5-dihydroimidazole.

11. The premix composition of claim 1, wherein said primary amine is selected from the group consisting of:
oleylamine,
tallow amine,
hydrogenated tallow amine,
soja alkyl amine,
cetyl amine,
stearyl amine,
lauryl amine,
myristyl amine, and mixtures thereof.

12. The premix composition of claim 1, wherein said organic, anionic sulphonate is the sodium salt of xylene sulphonate.

13. The premix composition of claim 1, further comprising a weak acid having a pK value >2.0.

14. The premix composition of claim 1, wherein said amine contains a polyalkoxy group selected from the group consisting of polyethoxy and polypropoxy groups.

15. A premix composition suitable for the preparation of thickened aqueous compositions having a pH of 0.5–4.0 by dilution with water, said premix composition consisting essentially of (i) an amine, selected from the group consisting of primary amines, secondary amines, tertiary amines, diamines, and amines in the form of a heterocyclic ring, wherein said primary, secondary, tertiary amines, and diamines carry at least one nitrogen linked hydrocarbon group which represents a saturated or unsaturated linear or branched alkyl group having at least 10 carbon atoms or an aryl, aralkyl or alkaryl containing up to 24 carbon atoms, and wherein the other nitrogen linked groups may be different or the same and represent hydrogen, substituted or unsubstituted alkyl groups, aryl groups, aralkyl groups or polyalkoxy groups containing 1–3 alkoxy groups, or wherein when the amine selected is in the form of a heterocyclic ring, it contains at least two nitrogen atoms, one of which is substituted by amino (lower) alkyl or hydroxy (lower) alkyl, which optionally is reacted with fatty acids, and said heterocyclic ring is further substituted with a linear or branched alkyl or alkenyl group having at least 10 carbon atoms;

(ii) an organic, anionic sulphonate selected from the group consisting of cumene sulphonate, xylene sulphonate, and toluene sulphonate, in their acid or salt form, and mixtures thereof.

16. A premix composition suitable for the preparation of thickened aqueous compositions by dilution with water, said premix composition consisting essentially of (i) an amine, selected from the group consisting of primary amines, secondary amines, tertiary amines, diamines, and amines in the form of a heterocyclic ring, wherein said primary, secondary, tertiary amines, and diamines carry at least one nitrogen linked hydrocarbon group which represents a saturated or unsaturated linear or branched alkyl group having at least 10 carbon atoms or an aryl, aralkyl or alkaryl containing up to 24 carbon atoms, and wherein the other nitrogen linked groups may be different or the same and represent hydrogen, substituted or unsubstituted alkyl groups, aryl groups, aralkyl groups or polyalkoxy groups, containing 1–3 alkoxy groups, or wherein when the amine selected is in the form of a heterocyclic ring, it contains at least two nitrogen atoms, one of which being substituted by amino (lower) alkyl or hydroxy (lower) alkyl, which optionally is reacted with fatty acids, while the ring is further substituted with a linear or branched alkyl or alkenyl group having at least 10 carbon atoms;

(ii) an organic, anionic sulphonate selected from the group consisting of cumene sulphonate, xylene sulphonate, and toluene sulphonate, in their acid or salt form, and mixtures thereof;

(iii) a weak acid having a pK value of >2.0.

* * * * *

UNITED STATES PATENT AND TRADEMARK OFFICE
CERTIFICATE OF CORRECTION

PATENT NO. : 5,041,239

DATED : August 20, 1991

INVENTOR(S) : Hans RORIG et al

It is certified that error appears in the above-identified patent and that said Letters Patent is hereby corrected as shown below:

IN THE ABSTRACT:

Line 2, change "thicknened" to --thickened--.

IN THE SPECIFICATION:

Col. 2, line 2, after "column" insert --1--;

line 4-5, change "quartenary" to --quaternary--;

line 8, change "Kong." to --Kongr.--;

line 25, change "ethoxygroups" to --ethoxy groups--.

Col. 3, line 16, change "alkarygroup" to --alkaryl group-- and change "24carbon" to --24 carbon--;
line 18, change "alkyl-" to --alkyl--;
line 19, change "arylgroup" to --aryl group--; change "aralkylgroups" to --aralkyl groups--;

line 48, after "acid" (fourth occurrence only), insert --is--.

Col. 4, line 12, after "is" insert --as--;

line 66, change "maine" to --amine--.

Col. 5, line 10, change "propoxyl)oleyl" to --propoxy)oleyl--.

Col. 7, line 19, after "," insert --and--;

line 20, change "," (second occurrence) to --.--;

UNITED STATES PATENT AND TRADEMARK OFFICE

CERTIFICATE OF CORRECTION

PATENT NO. : 5,041,239

DATED : August 20, 1991

INVENTOR(S) : Hans RORIG et al

It is certified that error appears in the above-identified patent and that said Letters Patent is hereby corrected as shown below:

Col. 8, line 58, delete "a".

Col. 10, line 8, after "of" insert --a--;

line 53, after "to" insert --that--;

line 54, change "f" to --of--.

Col. 11, line 20, change "m Pa.s" to --mPa.s--; change "mean" to --means--.

IN THE CLAIMS:

Col. 11, claim 1, line 5, change "consist" to --consisting--.

Col. 13, claim 11, line 3, change "oleylamine" to --oleyl amine--.

Signed and Sealed this

Sixth Day of April, 1993

*Attest:*

STEPHEN G. KUNIN

*Attesting Officer*

*Acting Commissioner of Patents and Trademarks*